Dec. 2, 1924.                                                    1,517,485
A. BADOWSKI
TIRE STEM PRESSURE GAUGE
Filed Oct. 19, 1921
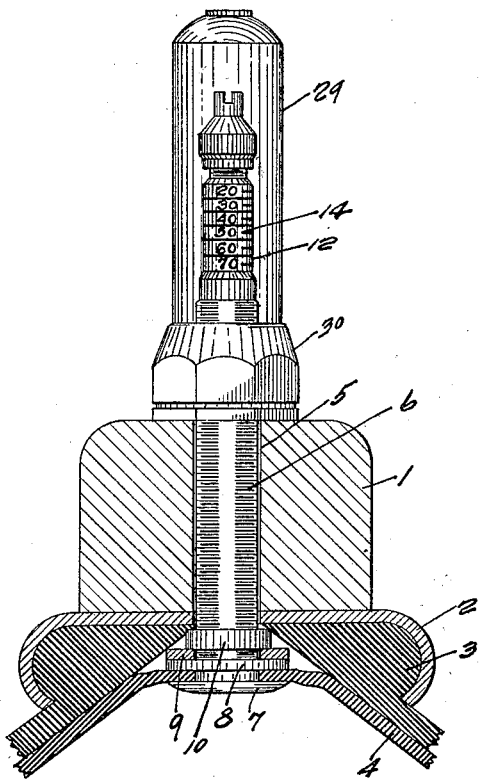
Fig. 1.
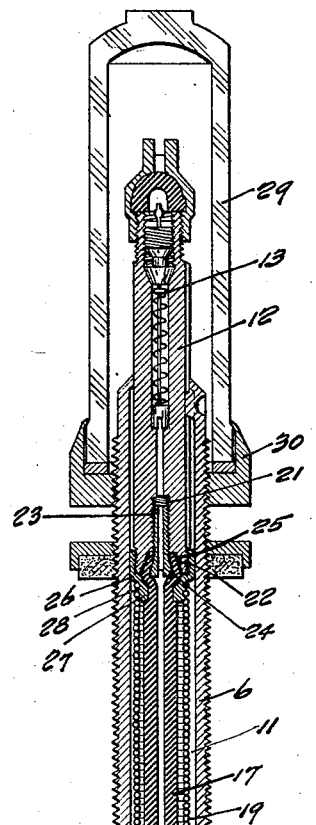
Fig. 2
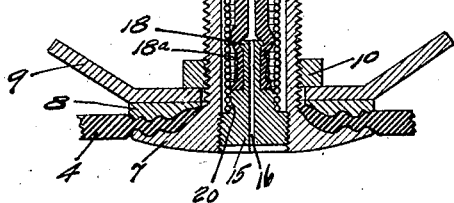
Alfred Badowski
Inventor.
By
Attorney.

Patented Dec. 2, 1924.

1,517,485

UNITED STATES PATENT OFFICE.

ALFRED BADOWSKI, OF CHARLESTON, WEST VIRGINIA, ASSIGNOR TO TIROMETER VALVE CORPORATION OF AMERICA, OF CHARLESTON, WEST VIRGINIA, A CORPORATION OF WEST VIRGINIA.

TIRE-STEM PRESSURE GAUGE.

Application filed October 19, 1921. Serial No. 508,730.

*To all whom it may concern:*

Be it known that I, ALFRED BADOWSKI, a citizen of the United States, residing at Charleston, in the county of Kanawha and State of West Virginia, have invented new and useful Improvements in Tire-Stem Pressure Gauges, of which the following is a specification.

Pressure gauges arranged in tire stems have been provided involving a plunger slidingly mounted in the stem and indicating by its movement the inflation pressure. In order to maintain communication between the plunger and the interior of the stem it has been common to utilize a rubber or elastic tube secured to the lower end of the plunger. It has also been common to provide a spring resisting the movement of the plunger. The present invention relates to the manner of securing the rubber tube to the plunger and also the spring.

The invention is illustrated in the accompanying drawings as follows:—

Fig. 1 shows a central section through a felloe with a pressure gauge in place thereon.

Fig. 2 a central section through the pressure gauge.

1 marks the felloe, 2 the rim on the felloe, 3 a tire, 4 an inner tube, and 5 an opening through the felloe.

The stem 6 has the usual head 7. The tire tube is clamped between the head 7 and a washer 8. The usual separating plate 9 is provided and a clamping nut 10 is arranged on the stem exerting pressure on the washer 8.

The stem has an opening 11 extending through it. A plunger 12 is slidingly mounted in the opening and the plunger has an inflation passage and is provided with the usual inflation valve 13. The plunger also is provided with a scale 14 which indicates the inflation pressure as the plunger moves incident to pressure.

An anchor plug 15 is screwed into the inner end of the opening 11. It has a passage 16 through it communicating with the interior of the tire tube. A rubber tube 17 extends over the nipple 18 on the anchor plug and is secured by a wrapping 18ª. A spring 19 is also secured on the anchor plug, the anchor plug being provided with the screw threads 20 for this purpose.

The plunger has a screw-threaded opening 21 leading to the passage through the plunger and this terminates at its lower end in a socket 22. A screw 23 is screwed into the screw-threaded opening 21 and is provided with a head 24 which is arranged in the end of the tube 17. The screw as it is driven into the opening 21 clamps the end of the tube against the walls of the socket 22. In order that the turning movement of the screw may be readily accomplished a ferrule 25 is arranged between the screw and the walls of the socket preferably next to the walls of the socket.

A flange nut 26 is screwed on to the plunger 12 and has a reduction portion 27 which is arranged around the tube 17 and as the nut is screwed on to the plunger clamps the end of the tube between the head of the screw 23 and the reduced portion 27 of the flange nut 26. The reduced portion is screw-threaded at 28 and affords a means for securing the spring 19. A transparent cap 29 is mounted in the base 30 which is secured to the stem. The transparent cap protects the pressure gauge and still permits of observation at all times.

What I claim as new is:—

1. In a tire stem pressure gauge, the combination with a sleeve; a plunger in the sleeve indicating by its movement the pressure in the sleeve, said plunger being provided with an inflation passage to which leads a screw-threaded opening terminating in a socket; a rubber tube forming an extensible means of communication from the plunger to a stationary part of the sleeve; a hollow screw having a head arranged in the tube and clamping the tube against the walls of the socket; of a flange nut screwed on to the plunger and extending over the end of the screw and clamping the tube against the screw.

2. In a tire stem pressure gauge, the combination with a sleeve; a plunger in the sleeve indicating by its movement the pressure in the sleeve, said plunger being provided with an inflation passage to which leads a screw-threaded opening terminating in a socket; a rubber tube forming an extensible means of communication from the plunger to a stationary part of the sleeve; a hollow screw having a head arranged in the tube and clamping the tube against the walls of the socket; of a flange nut screwed on to the plunger and extending over the end of the screw and clamping the tube against the screw, said flange nut having a reduced portion; and a spring resisting the movement of the plunger secured on said reduced portion.

In testimony whereof I have hereunto set my hand.

ALFRED BADOWSKI.